United States Patent [19]
Fulton

[11] Patent Number: 6,150,791
[45] Date of Patent: Nov. 21, 2000

[54] OPERATION OF SWITCHED RELUCTANCE MACHINES

[75] Inventor: Norman N. Fulton, Leeds, United Kingdom

[73] Assignee: Switched Reluctance Drives Limited, Harrogate, United Kingdom

[21] Appl. No.: 09/316,159

[22] Filed: May 21, 1999

[30] Foreign Application Priority Data

May 22, 1998 [GB] United Kingdom .................... 9811167

[51] Int. Cl.$^7$ ...................................................... H02P 1/46
[52] U.S. Cl. ........................ 318/701; 318/254; 318/138; 318/439
[58] Field of Search .................... 318/254, 138, 318/439, 701

[56] References Cited

U.S. PATENT DOCUMENTS

| | | | |
|---|---|---|---|
| 5,001,412 | 3/1991 | Carter et al. ............................ | 318/254 |
| 5,111,095 | 5/1992 | Hendershot . | |
| 5,319,297 | 6/1994 | Bahn . | |
| 5,777,416 | 7/1998 | Kolomeitsev . | |

FOREIGN PATENT DOCUMENTS 0 573 198 B1  11/1996  European Pat. Off. .

OTHER PUBLICATIONS

"Variable–Speed Switched Reluctance Motors", by P.J. Lawrenson et al., IEE Proc., vol. 127, Pt. B, No. 4, Jul. 1980, pp. 253–265.

"A New Magnetic Flux Pattern to Improve the Efficiency of the Switched Reluctance Motor", by A.M. Michaelides et al., Proc. IAS 92, Houston, Texas, Oct. 4–9, 1992, vol. 1, pp. 226–233.

"Optimum Commutation–current Profile on Torque Linearization of Switched Reluctance Motors", by D.S. Schramm et al., Proc. of ICEM 92, Sep. 15–17, 1992, Manchester, UK, vol. 2, pp. 484–488.

"Computer–Optimised Smooth–Torque Current Waveforms for Switched–Reluctance Motors", by H.C. Lovatt et al., IEE Proc.–Electr. Power Appl., vol. 144, No. 5, Sep. 1997, pp. 310–316.

"The Characteristics, Design and Applications of Switched Reluctance Motors and Drives", by Dr. J.M. Stephenson et al., PCIM '93, Nurnberg, Germany, Jun. 21–24, 1993, pp. 1–68.

*Primary Examiner*—Karen Masih
*Attorney, Agent, or Firm*—Patterson, Thuente, Skaar & Christensen, P.A.

[57] ABSTRACT

Multi-phase switched reluctance machines use a phase excitation sequence that avoids consecutively exciting adjacent phases and so leads to reduced torque ripple. Corresponding methods are also provided.

23 Claims, 9 Drawing Sheets

Prior Art

Fig 6(b)

Prior Art

OPERATION OF SWITCHED RELUCTANCE MACHINES

BACKGROUND OF THE INVENTION

1. Field of the Invention

This invention relates to the operation of polyphase switched reluctance machines by using unconventional patterns of excitation applied to the phase windings.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, the energization of the phase windings occurs at a controlled frequency. This is generally referred to as a synchronous reluctance machine, and it may be operated as a motor or a generator. In a second type of reluctance machine, circuitry is provided for detecting the angular position of the rotor and energizing the phase windings as a function of the rotor position. This is generally known as a switched reluctance machine and it may also be a motor or a generator. The characteristics of such switched reluctance machines are well known and are described in, for example, "The Characteristics, Design and Application of Switched Reluctance Motors and Drives" by Stephenson and Blake, PCIM '93, Nürnberg, 21–24 June 1993, which is incorporated herein by reference. The present invention is generally applicable to switched reluctance machines operating as motors or generators.

Figure 1:
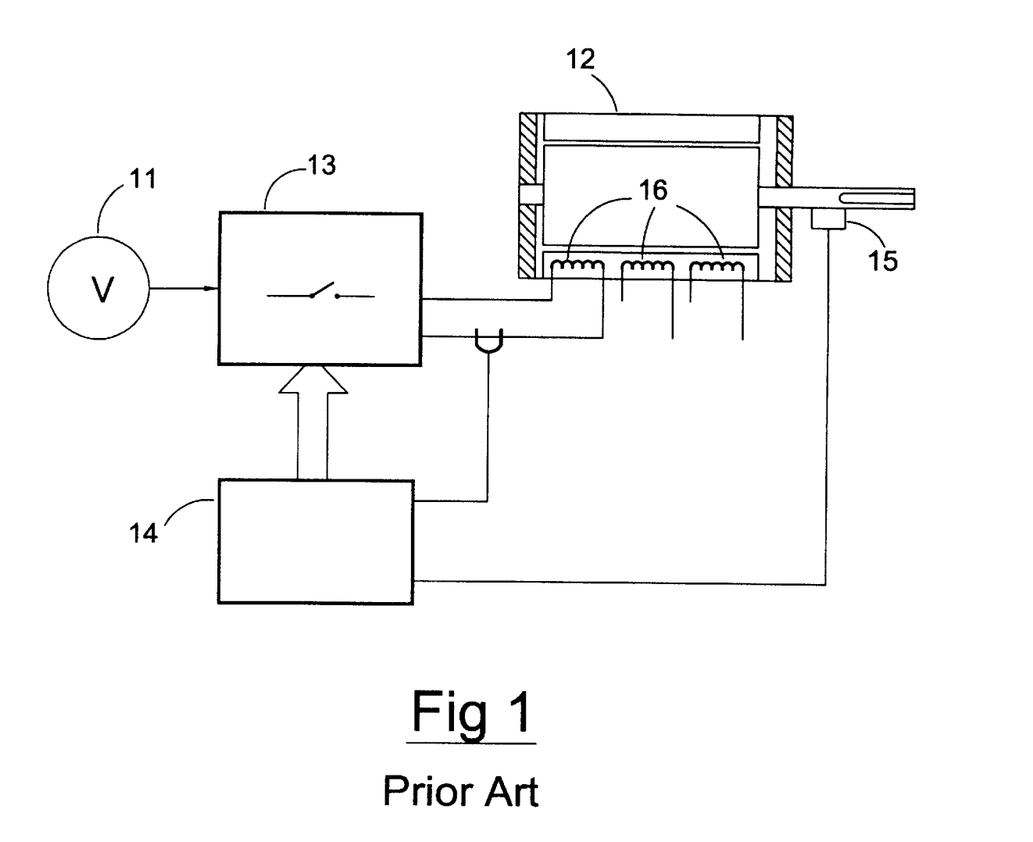
FIG. 1 shows the principal components of a typical switched reluctance drive system.

FIG. 1 shows the principal components of a typical switched reluctance drive system. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. The output of the rotor position detector 15 may also be used to generate a speed feedback signal.

The rotor position detector 15 may take many forms; for example it may take the form of hardware, as shown schematically in FIG. 1, or of a software algorithm which calculates the position from other monitored parameters of the drive system, as described in European Patent Application No. 0573198 (Ray), which is incorporated herein by reference. In some systems, the rotor position detector 15 can comprise a rotor position transducer that provides output signals that change state each time the rotor rotates to a position where a different switching arrangement of the devices in the power converter 13 is required.

Figure 2A:
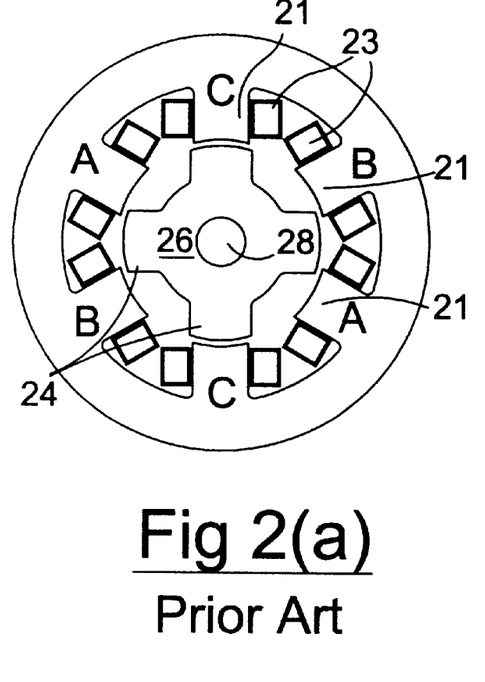
FIG. 2(a) shows a cross section of a typical switched reluctance machine in the aligned position.
Figure 2B:
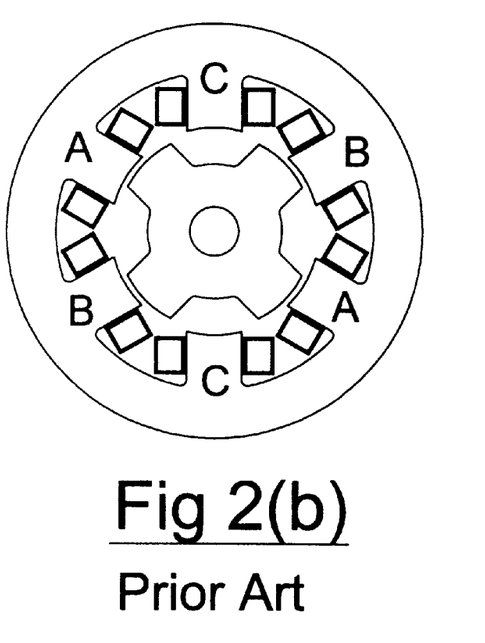
FIG. 2(b) shows the machine of FIG. 2(a) in the unaligned position.

The energization of the phase windings in a switched reluctance machine depends on the angular position of the rotor. This may be explained by reference to FIGS. 2(a), 2(b) and 3, which illustrate the switching of the phase windings of a reluctance machine operating as a motor. FIGS. 2(a) and 2(b) show a cross-section of a prior art, 3-phase, switched reluctance machine in which the stator has six poles and the rotor has four poles. Each stator pole 21 carries a coil 23. Coils on diametrically opposite poles are connected in series or parallel to form a phase winding 16. The stator poles in FIGS. 2(a) and 2(b) are labelled to illustrate the three phases A, B & C. The rotor poles 24 protrude from a rotor body 26.

The rotor is mounted on a shaft 28 to rotate coaxially in the bore of the stator. Typically, both stator and rotor are formed by stacking laminations of suitable electrical sheet steel and securing them together in known ways. Other forms of switched reluctance machines are well-known in the art: inverted machines have an outer rotor rotating around an inner stator; linear machines have longitudinal stator and rotor members which result in the linear motion of the "rotor".

FIG. 2(a) shows a rotor position where a rotor pole axis is coincident with the stator pole axis of Phase C. This is known as an aligned position for Phase C and is a position where the reluctance of the magnetic circuit associated with Phase C is at a minimum, i.e. the inductance of the phase is a maximum. FIG. 2(b) shows the position where the rotor has been rotated so that the centerline of an interpolar gap is aligned with the stator poles of Phase C. In this position, the reluctance of the magnetic circuit associated with Phase C is at a maximum, i.e. the inductance of the phase is a minimum. As the rotor rotates, the inductance of each phase winding varies cyclically, with the period of the cycle corresponding to the rotor pole pitch.

Figure 3:
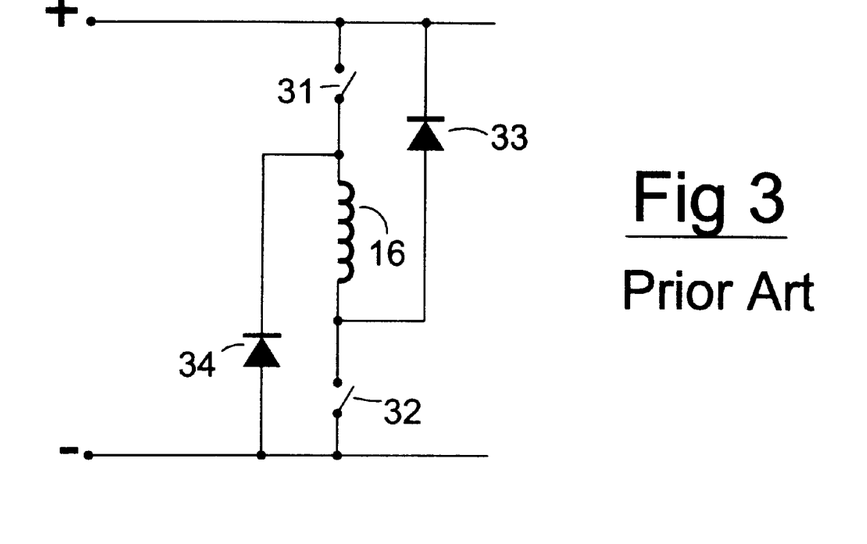
FIG. 3 shows typical switching circuitry in a power converter that controls the energization of the phase windings of the machine of FIGS. 1 and 2.

FIG. 3 generally shows typical switching circuitry in the power converter 13 that controls the energization of the phase winding 16. When switches 31 and 32 are closed, the phase winding is coupled to the source of DC power and is energized. Many other configurations of switching circuitry are known in the art: some of these are discussed in the Stephenson & Blake paper cited above.

Figure 4:
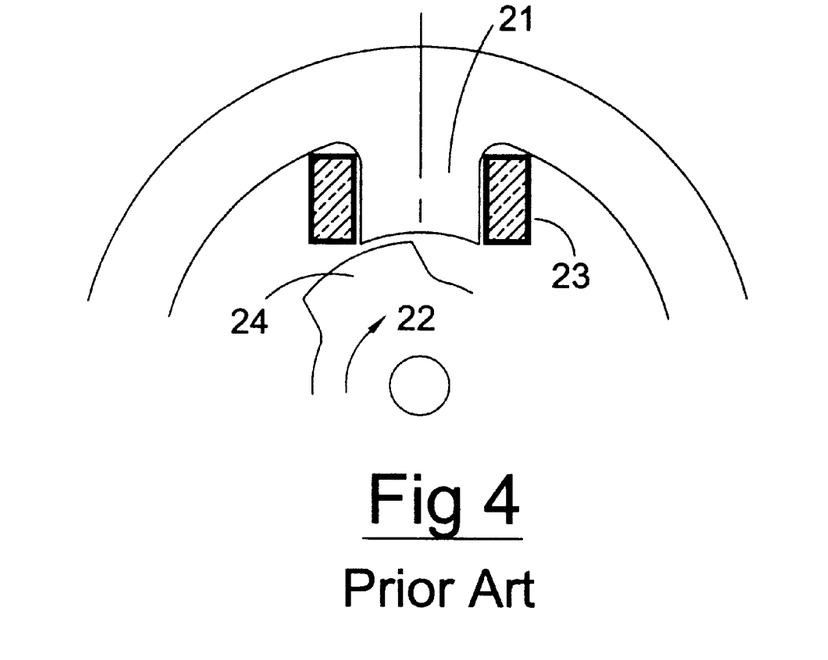
FIG. 4 is a typical schematic diagram of a rotor pole approaching a stator pole.

FIG. 4 generally shows a rotor pole 24 approaching a stator pole 21 according to arrow 22. As discussed above, when the coil 23 around stator pole 21 (which is a portion of the phase winding 16) is energized, a force will be exerted on the rotor, tending to pull rotor pole 24 into alignment with stator pole 21.

Figure 5:
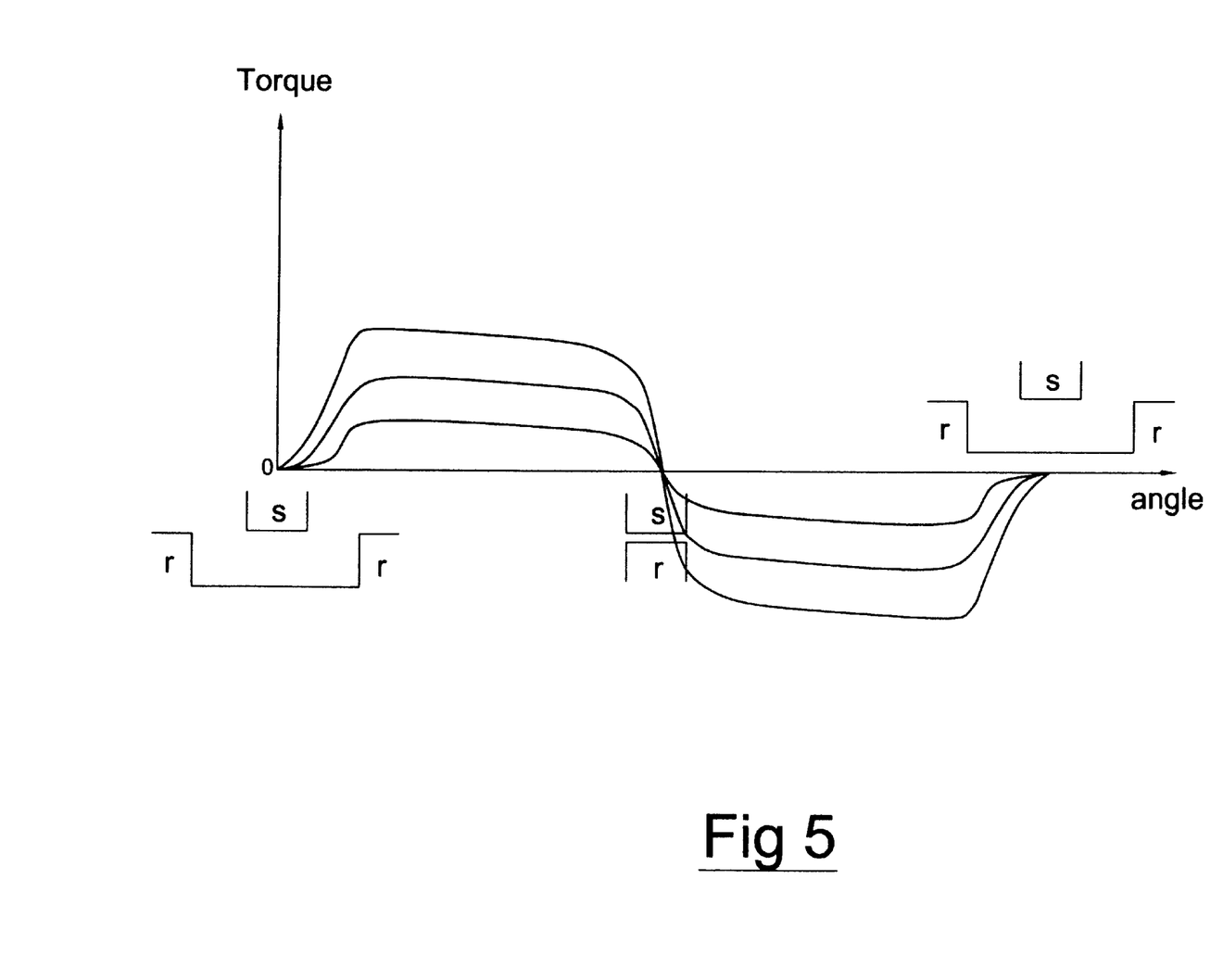
FIG. 5 shows typical curves of torque against rotor angle for three values of phase winding current.

When the phase winding of a switched reluctance machine is energized in the manner described above, the magnetic field set up by the flux in the magnetic circuit gives rise to the circumferential forces which, as described, act to pull the rotor poles into line with the stator poles. This force, acting at the radius of the air gap, develops torque on the shaft. A typical set of torque curves for one phase of a switched reluctance machine is shown in FIG. 5. The torque is shown over a complete rotor pole pitch, as the rotor moves from the position where the centerline of an interpolar gap on the rotor is aligned with the centerline of a stator pole (the "unaligned position"), through the position where the centerlines of the rotor and stator poles are aligned (the "aligned position"), to the position where the next interpolar centerline is aligned with the centerline of the stator pole. The torque curve is periodic with rotor pole pitch, and corresponds to the cyclical variation of inductance of the winding associated with the stator pole.

FIG. 5 shows the torque curves for three currents. As is well-known in the art, the magnitude of torque produced is not linearly related to the current, due to, inter alia, the nonlinearity of the magnetic characteristics of the lamination steel. In general terms, the torque at any point is proportional to the rate of change of inductance of the circuit providing the excitation for the magnetic circuit.

Figure 6A:
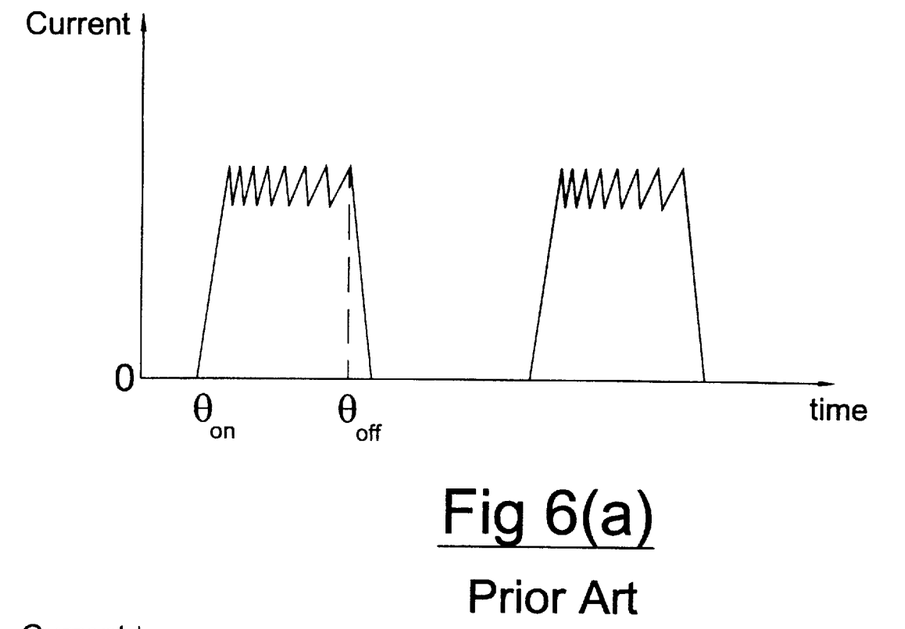
FIGS. 6(a) and 6(b) illustrate typical current waveforms of a switched reluctance drive operating in chopping and single-pulse modes respectively.

In general, the phase winding is energized to effect the rotation of the rotor as follows. At a first angular position of the rotor (called the "turn-on angle", $\theta_{ON}$), the controller 14 provides switching signals to turn on both switches 31 and 32. When the switches 31 and 32 are on, the phase winding is coupled to the DC bus, causing an increasing magnetic flux to be established in the machine. The magnetic flux produces a magnetic field in the air gap which acts on the rotor poles to produce the motoring torque. The magnetic flux in the machine is supported by the magneto-motive force (mmf) which is provided by a current flowing from the DC supply through the switches 31 and 32 and the phase winding 16. In some controllers, current feedback is employed and the magnitude of the phase current is controlled by chopping the current by rapidly switching one or both of switches 31 and/or 32 on and off. FIG. 6(a) shows a typical current waveform in the chopping mode of operation, where the current is chopped between two fixed levels. In motoring operation, the turn-on angle $\theta_{ON}$ is often chosen to be the rotor position where the centerline of an inter-polar space on the rotor is aligned with the centerline of a stator pole, but may be some other angle.

In many systems, the phase winding remains connected to the DC bus (or connected intermittently if chopping is employed) until the rotor rotates such that it reaches what is referred to as the "freewheeling angle", $\theta_{FW}$. When the rotor reaches an angular position corresponding to the freewheeling angle (e.g., the position shown in FIG. 4) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding, switch and diode is typically small, and the flux remains substantially constant. The circuit remains in this freewheeling condition until the rotor rotates to an angular position known as the "turn-off angle", $\theta_{OFF}$, (e.g. when the centerline of the rotor pole is aligned with that of the stator pole). When the rotor reaches the turn-off angle, both switches 31 and 32 are turned off and the current in phase winding 16 begins to flow through diodes 33 and 34. The diodes 33 and 34 then apply the DC voltage from the DC bus in the opposite sense, causing the magnetic flux in the machine (and therefore the phase current) to decrease.

Figure 6B:
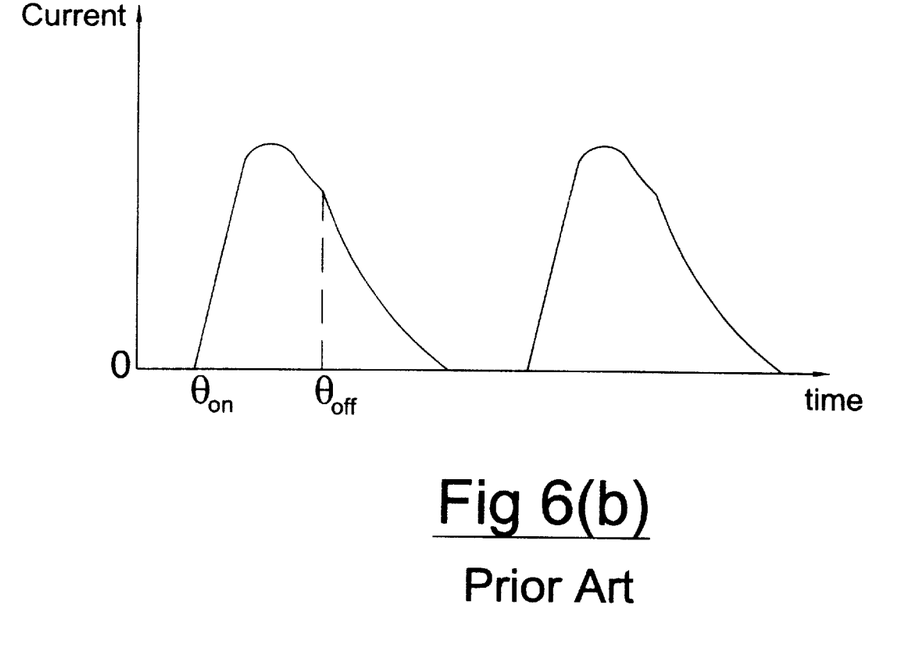

As the speed of the machine rises, there is less time for the current to rise to the chopping level, and the drive is normally run in a "single pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 6(b) shows a typical such single pulse current waveform where the freewheel angle is zero.

It is well-known that the values of turn-on, freewheel and turn-off angles can be predetermined and stored in some suitable format for retrieval by the control system as required, or can be calculated or deduced in real time.

Figure 7:
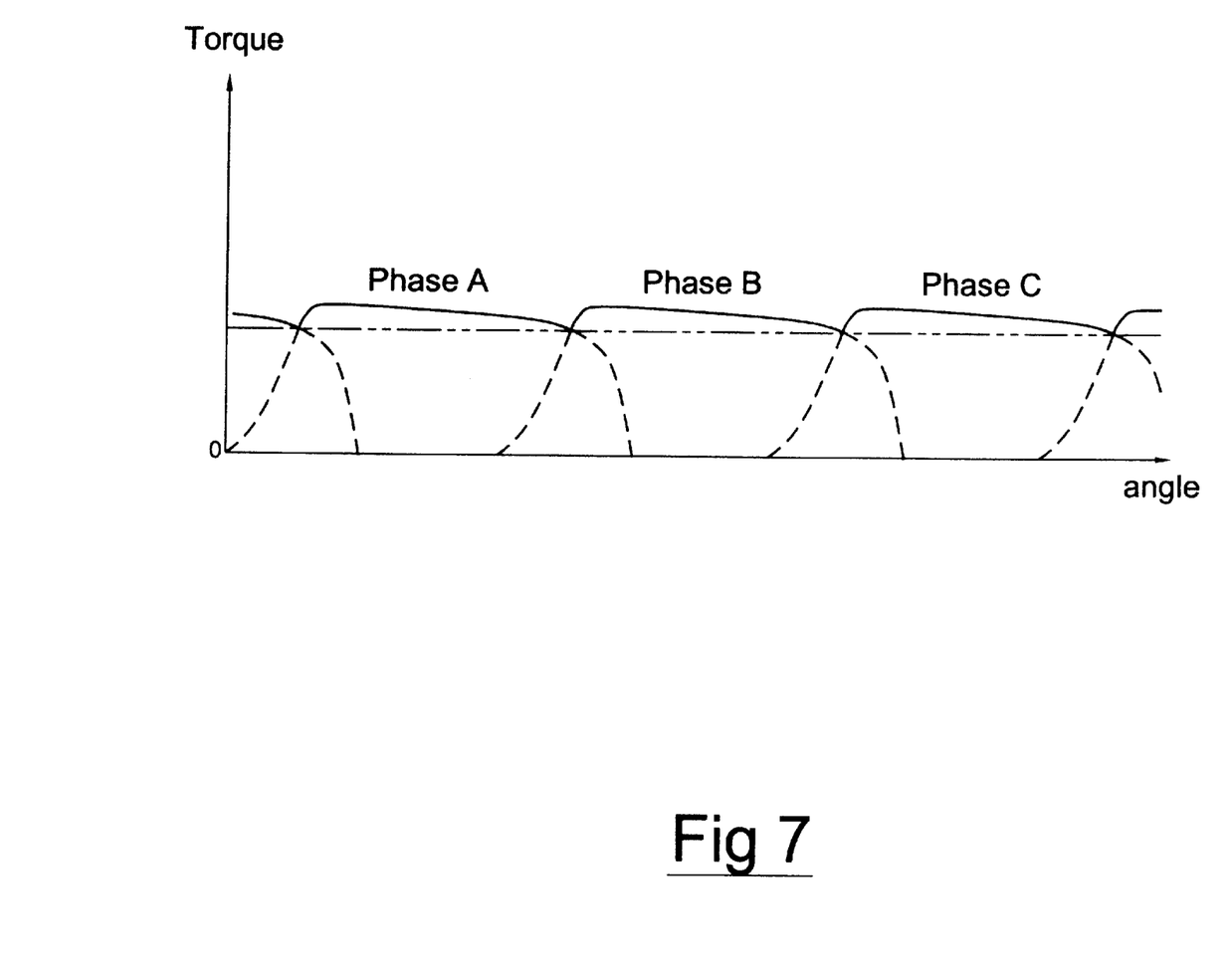
FIG. 7 shows a composite torque/angle curve produced from the operation of the machine of FIG. 2 with constant current.

The torque curves in FIG. 5 represent the positive and negative torques developed as the poles approach and leave each other. In a practical drive, some or all of the positive portion of a curve would be used to provide torque in one direction of rotation, and some or all of the negative portion of the curve would be used for rotation in the opposite direction. Since, even at constant current, the torque varies as a function of angle, the torque resulting from the excitation of all the phases (in turn or two or more simultaneously, depending on the excitation pattern chosen) is not smooth, but contains a ripple component. FIG. 7 shows the resultant curve when the top curve of FIG. 5 is commutated from each phase to the adjacent one. This assumes that phases are identical in their torque output and that the current can be removed from one phase and re-applied to the next phase instantaneously. Inspection of FIG. 2 shows that the rotor rotates clockwise for a counterclockwise phase excitation sequence of A B C. This feature is a consequence of the "vernier" action which arises from the dissimilar number of poles on the stator and rotor, and is peculiar to some forms of doubly salient machines.

From FIG. 7, it can be seen that the resultant torque/angle curve is not smooth, but has a cyclic variation ("torque ripple") about a mean value. While in many applications this ripple component is immaterial, there are applications where the torque ripple can adversely influence the load coupled to the shaft.

There have been many attempts to minimize the torque ripple by altering the excitation pattern of the windings. U.S. Pat. No. 5,319,297 to Bahn, for example, incorporated herein by reference, discloses a method of current shaping (i.e. profiling the value of current as the angle changes) to produce smoother torque. However, this and similar methods of excitation control have an impact on the size of switches required in the electronic controller which supplies the excitation, and the increase in switch size which is required can make a major impact on the cost of the drive. Such consequences have been discussed in, e.g., "Computer-Optimised Smooth-Torque Current Waveforms for Switched-Reluctance Motors" Lovatt, H. C. & Stephenson, J. M., IEE Proc. Electr. Power Appl., Vol. 144, No. 5, Sept. 1997, pp. 310–316, which is incorporated herein by reference.

Though such methods of current profiling can reduce the amount of ripple, it is almost impossible for them to reduce it to the very low levels required by some applications. This is because other effects come into play when the profiling is implemented. For example, to take account of the impossibility of removing or applying current instantly, current profiling schemes normally ramp the current down in one phase while ramping it up in a second phase, thus intending to keep the sum of the torques from the two phases to be a constant value. An example of such teaching is "Optimum Commutation-Current Profile on Torque Linearization of Switched Reluctance Motors", Schramm, D. S., Williams, B. W. & Green T. C., Proc. of ICEM 92, 15–17 Sept. 1992, Manchester, UK, Vol. 2, pp. 484–488, which is incorporated herein by reference. In principle this is a suitable scheme, but it requires finer and finer resolution of rotor position with increasing requirement for reduced ripple. This greatly increases the cost of the drive. Further, the simultaneous operation of two phases requires a consideration of the mutual inductances between phases, since both active phases now share parts of the (nonlinear) magnetic circuit and have adjacent poles where leakage flux is passing between them.

The net result is that there is an economic limit to the amount of reduction which can be achieved in torque ripple by current profiling methods, and the residual ripple is characterized by fast transients of torque over a small angular span, generally centered around the position where the phases overlap. This can be unacceptable in some applications.

Detailed measurements of machines excited with individual and simultaneous currents in two phases show that it is possible for the simultaneous excitation of the phases to produce either more or less torque than the sum of the individual excitations, depending on the polarities of excitation. This is due to the interaction of the mutual and main fluxes in the magnetic circuit. What is desirable is an economical and reliable method of removing the unwanted effects of these mutual fluxes and allowing the machine to produce smoother torque. None of the prior art has presented a satisfactory solution to this problem.

SUMMARY OF THE INVENTION

It is an object of the present invention to address the problem of torque ripple in a switched reluctance machine and to provide a machine which has reduced torque ripple.

According to one aspect of the present invention, there is provided a drive comprising a switched reluctance machine having n phase windings, where n is an odd integer greater than three, and a controller having energization means adapted to energize the n phase windings such that adjacent phase windings in the machine are not consecutively energized.

Preferably, the machine has five phases. Preferably, the stator has ten poles. The rotor may have six, eight or twelve poles, for example. The energization means may be arranged to excite every second or every third phase winding. Alternatively, the machine may have seven phases. Preferably the stator then has fourteen poles. The rotor preferably has twelve poles. The energization means may be arranged to excite every second or every third or every fourth or every fifth phase winding.

The machine may be a linear machine, may be inverted, may be bidirectional, and/or may be operated either as a motor or as a generator.

According to another aspect of the present invention, there is provided a method of operating a switched reluctance drive that has phase energization means for energizing five or more phase windings in a machine, the method comprising consecutively energizing non-adjacent phase windings, thereby to reduce torque ripple. Preferably, the machine has five phases and the method involves energizing every second or third phase. Alternatively, the switched reluctance machine may have seven phases. Preferably, the method then involves energizing every second or every third or every fourth or every fifth phase.

BRIEF DESCRIPTION OF THE DRAWINGS

The invention can be put into practice in various ways, some of which will now be described by way of example with reference to the accompanying drawings, in which.

DETAILED DESCRIPTION OF PREFERRED EMBODIMENTS

It has been noted above that, for the three-phase 6/4 machine illustrated in FIGS. 2(a) and 2(b), the rotor rotates in a direction opposite to the excitation sequence of the phases. The step angle of the machine, i.e. the angle between the commutation points in FIG. 7, is given by:

$$\epsilon = 360/qN_r \qquad (1)$$

where q is the number of phases and $N_r$ is the number of rotor poles. In this case, $\epsilon=30°$. The rotor pole pitch ($360/N_r$) is 90°. The step angle:pole pitch ratio, a measure of the amount of overlap between adjacent phases, as shown in FIG. 7, is therefore 0.333.

The method of reversing the direction of the machine is simply to reverse the excitation sequence of the phases, i.e. for counterclockwise rotation the sequence is A C B.

It is seen from FIG. 7 that a minimum value of torque is produced when the phases are commutated at the crossover points of the phase curves (assuming perfect commutation and constant current in the phases). This value is often called the "$\epsilon$ torque" and the torque ripple can be considered as being superimposed over it. Conventional wisdom teaches that, to reduce the torque ripple, the phase number and the rotor pole number should be increased, leading to smaller step angles and smaller values of step:pitch ratios. It is believed that these lower value parameters give machines which have lower torque ripple.

For example, a six-phase motor is known to be favored for low-ripple applications. This machine would typically have twelve stator poles, ten rotor poles, a rotor pole pitch of 36°, a step angle of 6°, and a step:pitch ratio of 0.167. Compared to the three-phase machine above, this appears to have much improved potential for low torque ripple. It is operated by exciting the phases in the sequence A B C D E F for one direction of rotation and A F E D C B for the opposite direction. While in practice this does improve on the ripple compared to, say, the three-phase machine, it has been found that although smooth torque can be obtained over much of the rotor pole pitch, there can be quite large swings of torque when adjacent phases are brought into operation. Until now, there has not been any solution to this problem.

Even higher phase numbers have been suggested to minimize the problem of torque ripple, for example, the paper "A New Magnetic Flux Pattern to Improve the Efficiency of the Switched Reluctance Motor", by Michaelides, A. M. & Pollock, C., Proc. IAS 92, Houston, Tex., Oct. 4–9 1992, Vol. 1, pp. 22–233, incorporated herein by reference, recommends the use of a seven-phase machine, with adjacent phase windings connected to have opposite polarity.

The present invention analyzes and solves the problem as follows.

Figure 8A:
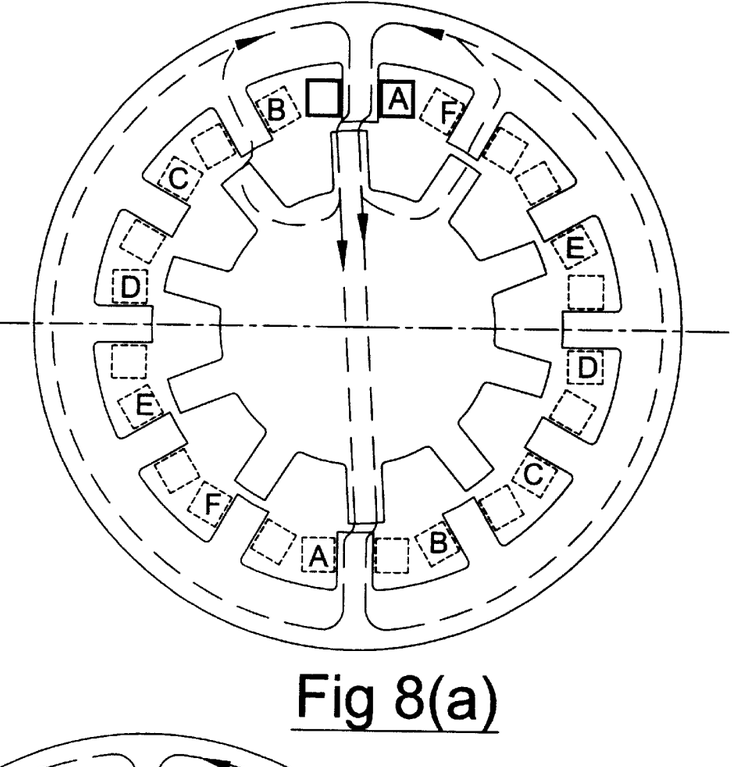
FIGS. 8(a)–8(c) show a six-phase switched reluctance motor with excitation applied to phases A and B.

Previous work has not recognized that there is a basic problem in that when adjacent poles of a switched reluctance machine are excited, the f5 mutual flux which already exists in the incoming phase will either add to or subtract from the main flux being established by the incoming phase and will therefore give unexpected results. This can be explained with reference to FIGS. 8(a)–8(c), which show a six-phase machine of typical proportions. FIG. 8(a) shows the rotor in a position at which the current in the coils of Phase A might be switched off and Phase B switched on (the rotor rotating clockwise).

Schematic flux paths are shown to illustrate the general direction of the flux in the machine. (Note that many details have been omitted in this drawing so as not to obscure the essential points; in particular, not all the flux paths are shown as these are extremely complex.)

It will be seen that the main flux path of Phase A produces the classical two-pole field, being driven around the machine by the mmf of the two coils of Phase A. The phase is connected such that, for this illustration, the top pole produces flux in a downwards direction. At the rotor position shown, there is some leakage flux from the top pole of Phase A to the two adjacent poles of Phases B and F. These fluxes take a short route through adjacent poles on the rotor and stator, travelling upwards in the adjacent poles. While the conventional teaching (e.g. "Variable-Speed Switched Reluctance Motors", Lawrenson, P. J., Stephenson, J. M., Blenkinsop, P. T., Corda, J. and Fulton, N. N., IEE Proc., Vol. 127, Pt. B, No. 4, July 1980, pp. 253–265, incorporated herein by reference) ignores the effects of such mutual fluxes, nevertheless they cross from the rotor to Phases B and F, so will produce some torque. Careful inspection of the torque/angle diagrams for the phases (i.e. the curves corresponding to FIG. 5), show that, at this rotor angle, Phase B is in a very torque-productive region and will produce positive torque and Phase F is not in a highly torque-productive region, though whatever torque is produced will be negative. The amounts of torque associated with these mutual fluxes will vary in a complex way, since the size of the mutual flux is critically dependent on the saturation characteristics of the main flux path of Phase A: as the flux in Phase A increases, the nonlinearity of the magnetic path (particularly the back iron path) demands a disproportionate increase in mmf, thus encouraging flux to flow in 'leakage' paths and increase the mutual coupling with adjacent phases.

It will therefore be realized that the magnitude of the resultant of the positive torque from Phase B and the negative torque from Phase F varies greatly with the level of excitation applied to Phase A. One skilled in the art will realize that similar arguments apply to the corresponding poles on the opposite side of the machine and that there will be other leakage paths of lesser significance present in the machine.

Now consider the situation when Phase B is brought into operation.

If the commutation of current from Phase A to Phase B were instantaneous, the flux pattern would simply jump round by one stator pole pitch. In practice, however, such commutation must take place over a finite time, so adjacent phases produce flux simultaneously. It will be apparent that Phase B can be connected to produce flux in the same direction as Phase A, or to produce flux in the opposite direction (i.e. the polarities of the magnetic poles can be the same or opposite).

Figure 8B:
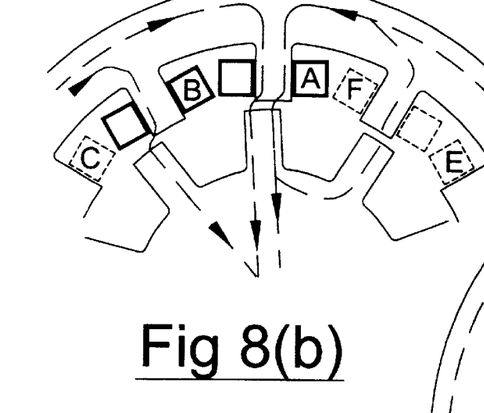

FIG. 8(b) shows the machine when Phase B is connected to produce flux in the same direction as Phase A. The mutual flux path from Phase A to Phase F will be substantially unchanged. However, the main flux produced by Phase B is in the opposite direction to the mutual flux from Phase A, so the net flux produced will be smaller than would otherwise be expected. This will give rise to a smaller torque from the incoming phase than would have been produced if that phase had been on by itself. To compound this, the negative contribution from Phase F will further reduce the net torque on the shaft. As the excitation on Phase A is reduced, these second-order effects will reduce abruptly as the magnetic circuit of Phase A comes out of saturation, so there will be a rapid rate of change of torque, giving rise to torque ripple which is extremely difficult to suppress.

Figure 8C:
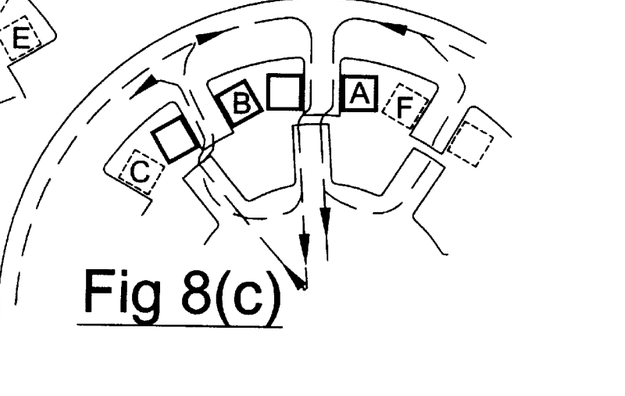

Consider now FIG. 8(c), in which Phase B is connected to have the opposite polarity to Phase A. The mutual flux is now in the same direction as the main flux of Phase B, so will add to the torque produced. This gives rise to an effect opposite to that described for FIG. 8(b), in that the torque from Phase B will fall as the excitation on Phase A is removed. However, there is still the same disturbance effect on torque.

All the prior art teaches that switched reluctance machines should be operated by exciting adjacent phases in sequence. For the six-phase machine just described, the sequence would be A B C D E F A . . . for clockwise rotation. If the machine were to be operated by energizing, say, every second phase, a sequence of A C E A . . . would result, using only three phases. This would produce very poor torque curves, with very large dips and possibly even with discontinuities. Similarly, a scheme using only every third phase would be A D A . . . i.e. only two phases would be used. It is clear that there is no benefit in using anything other than the standard, adjacent pole, sequence for a six-phase machine. Similar considerations of, say, four-phase and eight-phase machines will confirm that this conclusion applies also to any machine with an even phase number.

Whereas, as described earlier, it would not be expected that reducing the number of phases would improve torque ripple, it will now be shown that there is a benefit in using a five-phase machine, provided that a new excitation sequence is used.

Consider a five-phase machine. As discussed in the Lawrenson paper cited above, the principal pole combinations would be a ten-pole stator with either an eight-pole or a six-pole rotor. A twelve-pole rotor would also be possible but, according to the cited paper, would have inferior performance. Taking firstly the ten/eight machine, it will have a rotor pole pitch of 45°, a step angle of 9° and a step:pitch ratio of 0.2 (i.e. slightly higher than the six-phase, twelve/ten machine, as would be expected). The conventional excitation sequence is A B C D E A for clockwise rotation and A E D C B A for counterclockwise rotation. This machine suffers from the same problems as described above for the six-phase machine operated in the conventional way. However, if every second phase is energized (called a "skip 1" sequence), the excitation pattern now becomes A C E B D A . . . . This excitation pattern uses all the phases over a cycle, but never moves from one phase to an immediately adjacent one, so there is no significant interaction between the leakage flux of one phase and the incoming main flux of another.

Figure 9:
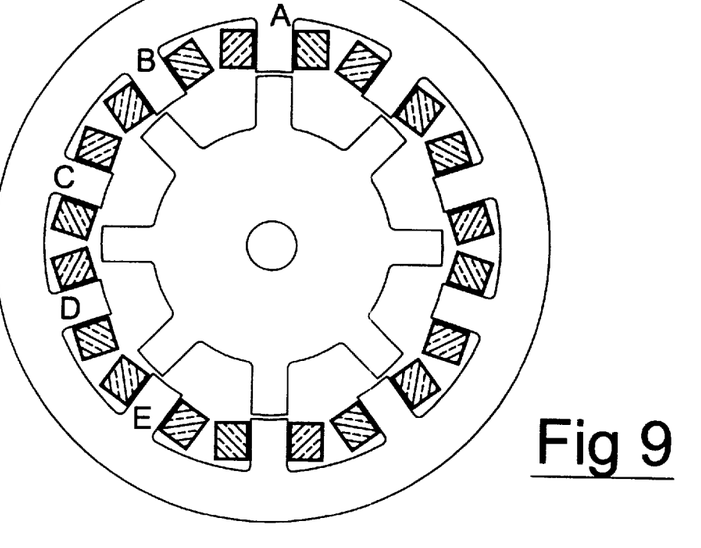
FIG. 9 shows a five-phase machine with ten stator poles and eight rotor poles that can be operated according to a method in which the invention is embodied.

FIG. 9 shows a five-phase machine with a ten-pole stator and an eight-pole rotor which can be operated in this way. The torque angle curves can be computed for this machine in the same way as for the three-phase and six-phase machines described above. The composite torque curve can then be built up as before, but now using the new phase sequence to decide the points at which the currents are commutated. Inspection of the relative positions between rotor and stator poles at the commutation points of the phase currents shows that while the absolute torque ripple is higher than with the conventional sequence it does not have the fast transients associated with the abrupt changes in torque due to mutual fluxes. This provides a machine in which the larger, but slower, variation of torque can be taken care of by conventional current profiling which does not have to attempt suppression of the faster transient torques.

By energizing every third phase (i.e. "skip 2"), an excitation pattern of A D B E C A . . . is produced. This is the reverse of the skip 1 sequence and allows the machine to run in the reverse direction with the same torque profile as the skip 1 sequence. A "skip 3" sequence gives A E D C B A . . . , which is simply the reverse of the conventional sequence.

It has therefore been shown that, by using an excitation sequence which does not excite adjacent phases, i.e. skip 1 or skip 2, the torque ripple can be reduced while still retaining bi-directional operation of the machine.

Figure 10:
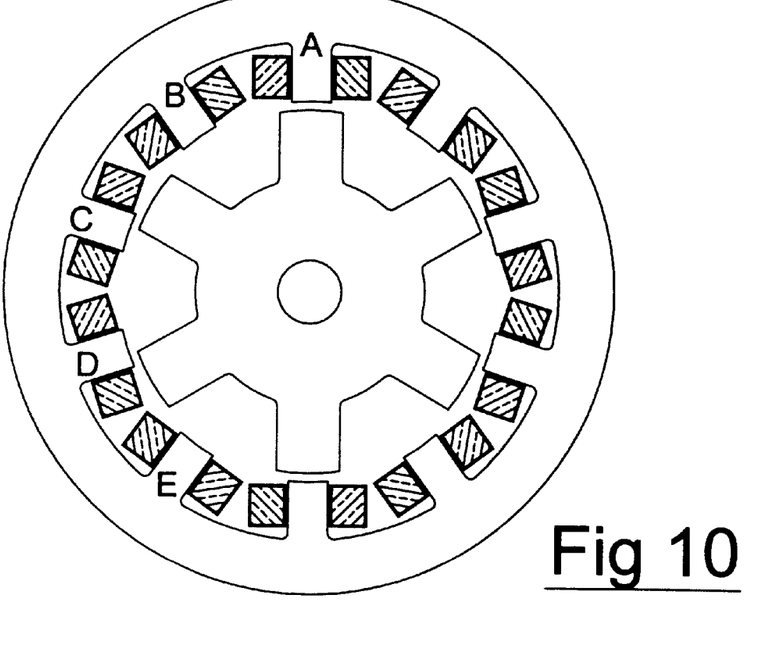
FIG. 10 shows a five-phase machine with ten stator poles and six rotor poles.

FIG. 10 shows a machine having five phases, six rotor poles and ten stator poles. This has a rotor pole pitch of 60° and a step angle of 12°. The skip 1 sequence of A C E B D A . . . gives rotation in the reverse direction from the skip 1 sequence for the ten/eight machine discussed above, and the skip 2 sequence of A D B E C A . . . gives rotation in the other direction, i.e. this machine also is bi-directional. The skip 3 sequence of A E D C B A . . . is the reverse of the conventional A B C D E sequence. Inspection of the torque curves indicates that this ten/six machine gives better "vernier" action when operated with a skip 1 or skip 2 sequence, since the positions of the rotor poles relative to the stator poles at the commutation points are such that the torque curves are at their most effective. This further minimizes the low frequency torque ripple and is a preferred embodiment.

Figure 11:
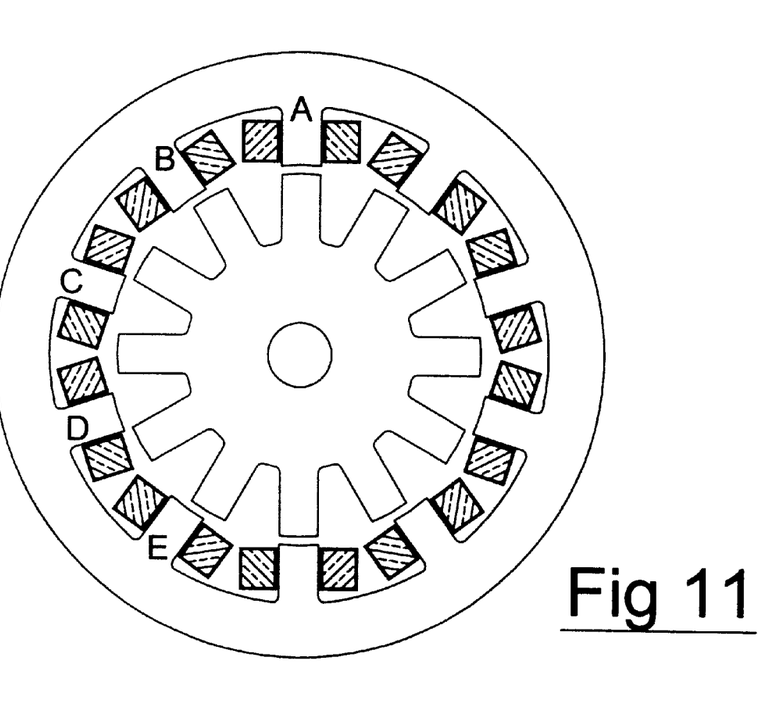
FIG. 11 shows a five-phase machine with ten stator poles and twelve rotor poles.

By applying the same methods, it can be shown that it is also possible to use a machine with ten stator poles and twelve rotor poles, as shown in FIG. 11. This machine can be operated with a skip 1 or skip 2 sequence, as described above.

Figure 12:
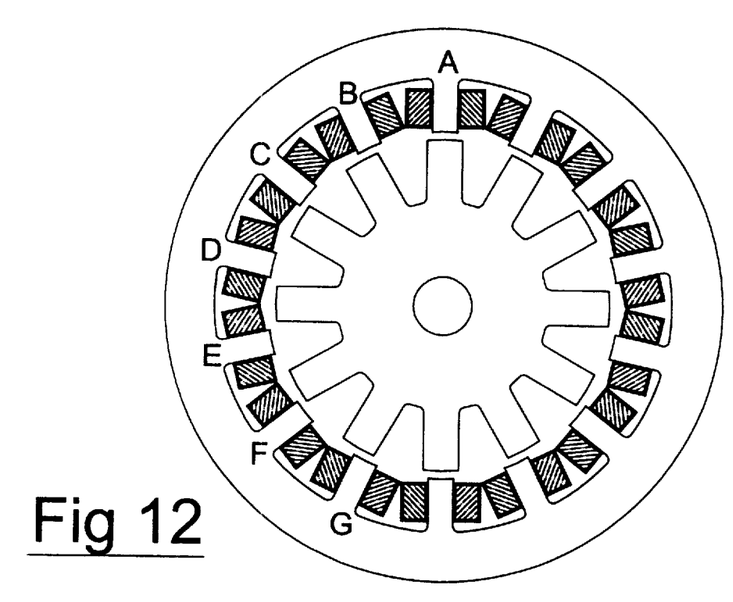
FIG. 12 shows a seven-phase machine with fourteen stator poles and twelve rotor poles.

FIG. 12 shows a seven-phase machine with 14 stator poles and 12 rotor poles. Those familiar with the art will realize that other pole combinations, e.g., 14 stator poles with 16, 10 or 8 rotor poles or 28 stator poles with 24, 20 or 16 rotor poles are possible. The conventional excitation pattern is the sequence A B C D E F C A . . . . By applying the methods as described above, it can be seen that a skip 1 sequence of A C E G B D F A . . . gives rotation in the same direction as the conventional excitation, without ever energizing adjacent phases. Similarly, a skip 2 sequence of A D G C F B E A . . . is shown to give clockwise rotation. Using a skip 3 sequence of A E B F C G D A . . . gives counterclockwise rotation and, by inspection, is seen to be the reverse of the skip 2 sequence. Similarly, a skip 4 sequence of A F D B G E C A . . . gives counterclockwise direction and, by inspection, is the reverse of the skip 1 sequence. It is therefore shown that it is possible to use a skip 1 and skip 4 sequence or a skip 2 and skip 3 sequence to give bidirectional operation while achieving the aim of never energizing adjacent poles of the machine.

From the discussions above, it will be apparent that non-adjacent excitation sequences can be applied with benefit to any switched reluctance machine with an odd number of phases greater than three.

While the illustrative embodiments given above have been explained in terms of motoring operation, it will be appreciated that the excitation sequences apply equally to generating operation. Further, it will be recognized that the invention can be used with linear or inverted machines. Accordingly, the above description of embodiments is made by way of example and not for the purposes of limitation.

What is claimed is:

1. A switched reluctance drive comprising a switched reluctance machine having n phase windings, where n is an odd integer greater than three, and a controller having means for energizing the n phase windings to avoid consecutive energization of adjacent phase windings in the machine.

2. A drive as claimed in claim 1, wherein n equals 5.

3. A drive as claimed in claim 2, wherein the machine has a stator with ten poles.

4. A drive as claimed in claim 3, wherein the machine has a rotor with six poles.

5. A drive as claimed in claim 3, wherein the machine has a rotor with eight poles.

6. A drive as claimed in claim 3, wherein the machine has a rotor with twelve poles.

7. A drive as claimed in claim 1, wherein the energization means is arranged to energize every second phase winding.

8. A drive as claimed in claim 1, wherein the energization means is arranged to energize every third phase winding.

9. A drive as claimed in claim 1, wherein n equals 7.

10. A drive as claimed in claim 9, wherein the energization means is arranged to energize every second phase winding.

11. A drive as claimed in claim 9, wherein the energization means is arranged to energize every third phase winding.

12. A drive as claimed in claim 9, wherein the energization means is arranged to energize every fourth phase winding.

13. A drive as claimed in claim 9, wherein the energization means is arranged to energize every fifth phase winding.

14. A drive as claimed in claim 1, wherein the machine is a linear machine.

15. A drive as claimed in claim 1, wherein the machine is inverted.

16. A drive as claimed in claim 1, wherein the machine is bi-directional.

17. A method of operating a switched reluctance drive that has means for energizing five or more phase windings in a machine, the method comprising consecutively energizing non-adjacent phase windings to reduce torque ripple.

18. A method as claimed in claim 17, wherein every second phase winding is energized.

19. A method as claimed in claim 17, wherein the switched reluctance machine has five phase windings and the method includes energizing every third phase winding.

20. A method as claimed in claim 17, wherein the switched reluctance machine has seven phase windings and the method includes energizing every third phase winding.

21. A method as claimed in claim 17, wherein the switched reluctance machine has seven phase windings and the method includes energizing every fourth phase winding.

22. A method as claimed in claim 17, wherein the switched reluctance machine has seven phase windings and the method includes energizing every fifth phase winding.

23. A switched reluctance machine having n phase windings, where n is an odd integer greater than three, and a controller for energizing the n phase windings to avoid consecutive energization of adjacent phase windings in the machine.

* * * * *